United States Patent
Chao

(10) Patent No.: US 12,425,237 B2
(45) Date of Patent: Sep. 23, 2025

(54) GUARDING DEVICE ONBOARDING OWNERSHIP VOUCHERS AGAINST UNAUTHORIZED OWNERSHIP CHANGES

(71) Applicant: Dell Products L.P., Round Rock, TX (US)

(72) Inventor: Ching-Yun Chao, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 424 days.

(21) Appl. No.: 18/046,687

(22) Filed: Oct. 14, 2022

(65) Prior Publication Data

US 2024/0129136 A1     Apr. 18, 2024

(51) Int. Cl.
*H04L 9/32*     (2006.01)
*H04L 9/00*     (2022.01)

(52) U.S. Cl.
CPC .......... *H04L 9/3268* (2013.01); *H04L 9/3234* (2013.01); *H04L 9/50* (2022.05)

(58) Field of Classification Search
CPC ........ H04L 9/3234; H04L 9/3268; H04L 9/50
See application file for complete search history.

(56) References Cited

U.S. PATENT DOCUMENTS

| | | | |
|---|---|---|---|
| 11,522,755 B1 | 12/2022 | Warkhedi et al. | |
| 12,174,961 B2 * | 12/2024 | Terpstra | G06F 8/63 |
| 2017/0366347 A1 | 12/2017 | Smith | |
| 2019/0349426 A1 | 11/2019 | Smith et al. | |
| 2020/0186998 A1 | 6/2020 | Smith et al. | |
| 2023/0229778 A1 * | 7/2023 | Terpstra | G06F 21/73 713/2 |
| 2023/0325130 A1 * | 10/2023 | Yanagi | G06F 3/1253 358/1.15 |
| 2023/0325132 A1 * | 10/2023 | Yoshida | G06F 3/1229 358/1.15 |

(Continued)

OTHER PUBLICATIONS

Cooper et al., FIDO Device Onboard Specification Review Draft, Dec. 2, 2020 https://fidoalliance.org/specs/FDO/FIDO-Device-Onboard-RD-v1.0-20201202.html (Year: 2020).*

(Continued)

*Primary Examiner* — Kostas J Katsikis
(74) *Attorney, Agent, or Firm* — Amin, Turocy & Watson, LLP

(57) ABSTRACT

A system can receive a first ownership voucher for a device that identifies a first entity as being the owner. The system can receive a second ownership voucher indicative of the first entity changing the owner to a second entity. The system can determine that the first entity is the owner based on the first ownership voucher. The system can update the owner to be the second entity via storing the second ownership voucher. The system can, based on receiving second user input associated with the second entity, verify the second entity as the owner using the second ownership voucher. The system can, based on verifying the second entity as the owner, store an identifier of a device onboarding service used to perform the verifying. The system can direct the device to access the device onboarding service to provision the device using the identifier of the device onboarding service.

20 Claims, 11 Drawing Sheets

(56) References Cited

U.S. PATENT DOCUMENTS

| | | | | |
|---|---|---|---|---|
| 2023/0325535 | A1* | 10/2023 | Sharma | G06F 21/73 |
| | | | | 726/17 |
| 2023/0325848 | A1* | 10/2023 | Mudivarthy | G06Q 30/0185 |
| | | | | 709/222 |
| 2023/0325849 | A1* | 10/2023 | Sharma | H04L 9/3247 |
| | | | | 705/318 |
| 2023/0325850 | A1* | 10/2023 | Khokhar | H04L 9/0825 |
| | | | | 705/318 |
| 2023/0328061 | A1* | 10/2023 | Mori | H04L 63/0876 |
| | | | | 726/6 |
| 2023/0353641 | A1* | 11/2023 | Jreij | H04L 41/0806 |
| 2023/0394493 | A1* | 12/2023 | Rao | G06Q 30/018 |
| 2023/0413060 | A1 | 12/2023 | Baskaran et al. | |
| 2024/0031337 | A1* | 1/2024 | Sharma | H04L 67/289 |
| 2024/0039706 | A1* | 2/2024 | Sharma | H04L 9/3247 |
| 2024/0129736 | A1 | 4/2024 | Chao | |

OTHER PUBLICATIONS

Cooper, et al. "FIDO Device Onboard Specification 1.1" Fido Alliance. [https://fidoalliance.org/specs/FDO/FIDO-Device-Onboard-RD-v1.1-20211214/], Dec. 14, 2021, 114 pages.

Notice of Allowance mailed Aug. 2, 2024 for U.S. Appl. No. 18/046,646, 28 pages.

* cited by examiner

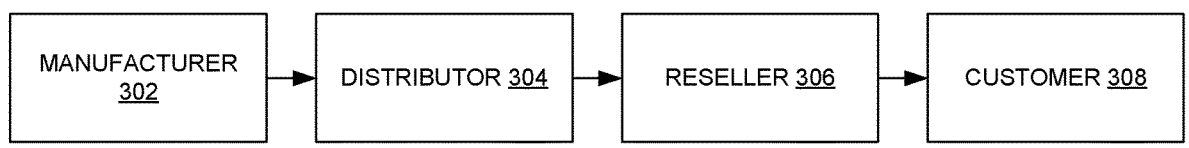
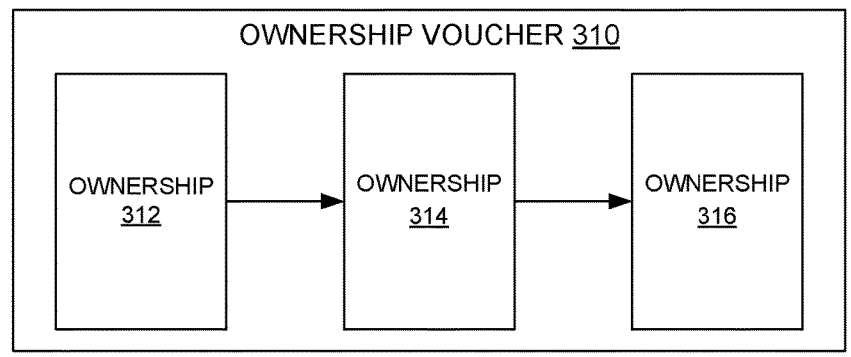
FIG. 3

500

( 502 )

↓

RECEIVING A FIRST OWNERSHIP VOUCHER APPLICABLE TO OWNERSHIP OF A DEVICE, WHEREIN THE FIRST OWNERSHIP VOUCHER IDENTIFIES A FIRST ENTITY AS AN OWNER OF THE DEVICE AND A PRIOR OWNER, WHEREIN THE FIRST OWNERSHIP VOUCHER IDENTIFIES THAT THE FIRST OWNER HAS PERMISSION TO SET A NEW OWNER OF THE DEVICE, AND WHEREIN THE FIRST OWNERSHIP VOUCHER IDENTIFIES THAT THE PRIOR OWNER HAS PERMISSION TO REVOKE THE FIRST ENTITY FROM BEING THE OWNER OF THE DEVICE 504

RECEIVING A SECOND OWNERSHIP VOUCHER INDICATIVE OF THE FIRST ENTITY CHANGING THE OWNER OF THE DEVICE TO A SECOND ENTITY 506

DETERMINING THAT THE FIRST ENTITY IS THE OWNER OF THE DEVICE BASED ON THE FIRST OWNERSHIP VOUCHER 608

UPDATING THE OWNER OF THE DEVICE TO THE SECOND ENTITY VIA STORING THE SECOND OWNERSHIP VOUCHER 510

RECEIVING A SECOND OWNERSHIP VOUCHER THAT INDICATES THAT THE OWNER OF THE DEVICE HAS BEEN UPDATED TO A THIRD ENTITY 604

↓

DETERMINING THAT THE SECOND ENTITY IS THE OWNER OF THE DEVICE BASED ON THE SECOND OWNERSHIP VOUCHER 606

↓

UPDATING THE OWNER OF THE DEVICE TO THE THIRD ENTITY VIA STORING THE THIRD OWNERSHIP VOUCHER 608

GUARDING DEVICE ONBOARDING OWNERSHIP VOUCHERS AGAINST UNAUTHORIZED OWNERSHIP CHANGES

BACKGROUND

An entity can acquire new computing devices for its use, and configure them to be used in its network of devices. There can be protocols to onboard computing devices to a particular entity's device management system. A device management system can be configured to manage the devices in an entity's network of devices.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can receive a first ownership voucher for a device, wherein the first ownership voucher identifies a first entity as being an owner of the device. The system can receive second ownership voucher indicative of the first entity changing the owner of the device to a second entity. The system can determine that the first entity is the owner of the device based on the first ownership voucher. The system can update the owner of the device to be the second entity via storing the second ownership voucher. The system can, based on receiving second user input associated with the second entity, verify the second entity as the owner of the device using the second ownership voucher. The system can, based on verifying the second entity as the owner, store an identifier of a device onboarding service used to perform the verifying. The system can, in response to receiving a message from the device, direct the device to access the device onboarding service to provision the device using the identifier of the device onboarding service.

An example method can comprise receiving, by a system comprising a processor, a first ownership voucher applicable to ownership of a device, wherein the first ownership voucher identifies a first entity as an owner of the device and a prior owner, wherein the first ownership voucher identifies that the first owner has permission to set a new owner of the device, and wherein the first ownership voucher identifies that the prior owner has permission to revoke the first entity from being the owner of the device. The method can further comprise receiving, by the system, a second ownership voucher indicative of the first entity changing the owner of the device to a second entity. The method can further comprise determining, by the system, that the first entity is the owner of the device based on the first ownership voucher. The method can further comprise updating, by the system, the owner of the device to the second entity via storing the second ownership voucher.

An example non-transitory computer-readable medium can comprise instructions that, in response to execution, cause a system comprising a processor to perform operations. These operations can comprise receiving a second ownership voucher from a first entity indicative of changing an ownership of a device from the first entity to a second entity. These operations can further comprise determining that the first entity has the ownership of the device based on a first ownership voucher of the device that identifies the first entity of the ownership of the device, wherein the first ownership voucher indicates that the first entity has a permission to specify a new owner of the device. These operations can further comprise updating the ownership of the device to the second entity via storing the second ownership voucher.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 3 illustrates another example system architecture that can facilitate guarding device onboarding ownership vouchers against unauthorized ownership changes, in accordance with an embodiment of this disclosure;

FIG. 5 illustrates another example process flow that can facilitate guarding device onboarding ownership vouchers against unauthorized ownership changes, in accordance with an embodiment of this disclosure;

FIG. 6 illustrates another example process flow that can facilitate guarding device onboarding ownership vouchers against unauthorized ownership changes, in accordance with an embodiment of this disclosure;

DETAILED DESCRIPTION

Overview

Figure 1:
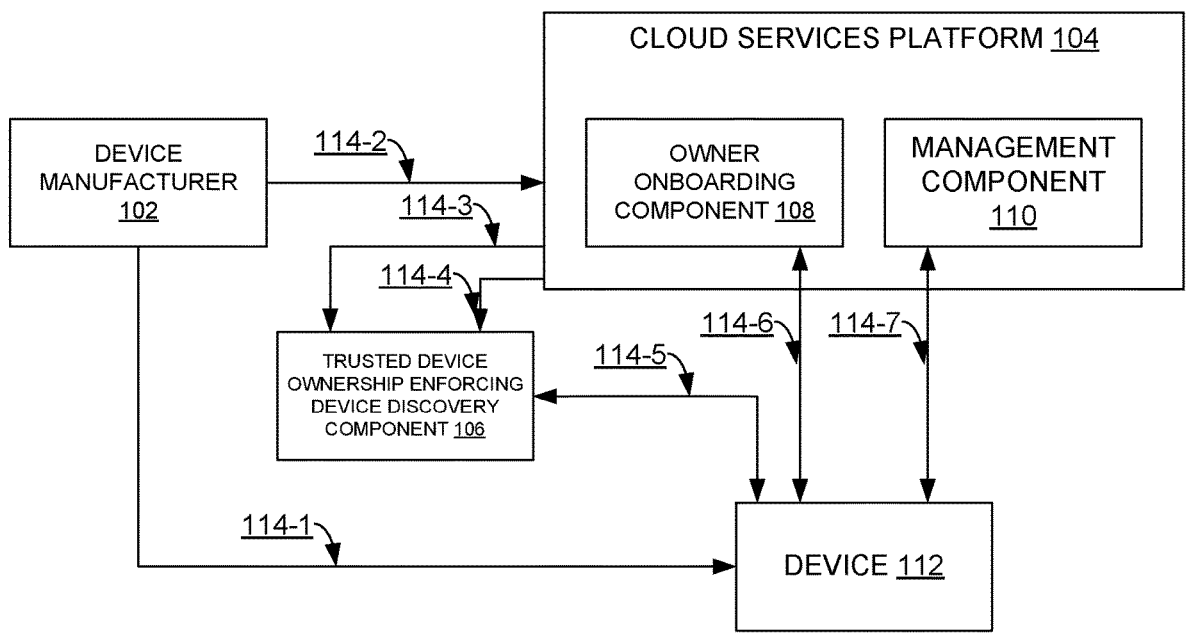
FIG. 1 illustrates an example system architecture that can facilitate guarding device onboarding ownership vouchers against unauthorized ownership changes, in accordance with an embodiment of this disclosure.

The present techniques can generally be implemented as part of a device onboarding protocols. Examples described herein generally refer to a Fast Identification (ID) Online (FIDO) Device Onboarding (FDO) protocol, and it can be appreciated that the present techniques can be applied to a variety of protocols. An FDO protocol can comprise device onboarding automation technology. FDO can generally be designed to be a zero-touch onboarding solution that aims to streamline an Internet of Things (IoT) supply chain from a manufacturing factory to a cloud service provider or a device management platform, with auto-provisioning at a target destination via late binding. FDO can use public key management technology to provide verifiable security protection through the supply chain.

When manufactures build a device, they can also generate a digital owner voucher that. It can be that the ownership voucher is not shipped with the device. A device and the ownership voucher can be cryptographically linked together using public key technology. In some examples, a private key, which can be generated on the device, never leaves the device. In some examples, the private key can be generated and stored in a Trusted Platform Module (TPM) chip soldered on the motherboard of the device. A public certificate for the public key, according to an International Telecommunication Union X.509 standard, can be signed by a trusted certificate authority. This certificate can be stored in the ownership voucher.

When users, e.g., cloud service providers, device management service providers, etc., order a device, they can get the ownership voucher that contains their public key signed by seller. Their ownership vouchers can be used to prove the user's ownership of the device. The device can then be delivered to the owner.

In the meantime, the owner can register the new owner onboarding service and other information for the device in a Rendezvous computer networking service, which can be used by devices to find each other, and can generally be called a device discovery service.

When the device is powered on and plugged into the user's network, the device can try to connect to the device discovery service using an Internet Protocol (IP) address that is preconfigured in the device.

Once connected to the device discovery service, a device can retrieve the ownership voucher, and verify the certificate in the ownership voucher. Using information provided by the user along with the ownership voucher in the device discovery service, a device can initiate an onboarding protocol with the user, e.g., a cloud service provider. Here, the device user can verify whether the device does have the matching private key, and the device can verify whether the user has the matching signer key of the ownership voucher.

If both validations are successful, the user can establish a trust relationship with the device and start device management.

When manufacturers build a device, they can also generate a digital owner voucher. It can be that the ownership voucher is not shipped with the device. A device and the ownership voucher can be cryptographically linked together using public key technology. In some examples, a private key, which can be generated on the device, never leaves the device. In some examples, the private key can be generated and stored in a Trusted Platform Module (TPM) chip fixed, e.g., soldered, on the motherboard of the device. A public certificate for the public key, according to an International Telecommunication Union X.509 standard, can be signed by a trusted certificate authority. The manufacturer can then store the device information including a unique device globally unique identifier (GUID), the X.509 certificate, etc.

Consider an example where a distributor places an order for this device. The manufacturer can create an ownership voucher with the first entry of the certificate chain. The first entry can contain the device information, device discovery service (e.g., a Rendezvous service) information, and the distributor's public hey, which can be signed with the manufacturer's private key. When a reseller orders the device from the distributor, the distributor can add a second entry into the ownership voucher certificate chain. The second entry can contain device information and the reseller's public key, which can be signed by the distributor's private key. When a user orders the device from the reseller, the reseller can add a third entry to the ownership voucher certificate chain. The third entry can contain the device information and the user's public key, which is signed with the reseller's private key.

An owner of the device (that is, whoever's public key is in the last entry of the certificate chain), can prove the ownership by validating the public key against that entity's private key. FDO protocols can use this mechanism to validate the ownership. This design can achieve a goal of transferring device ownership along the supply chain and supporting ownership validation. However, there can be a problem that there is no good way to prevent an intermediate owner, (e.g., a reseller or a distributor) to setup the device using FDO protocols after a user has become the owner of a device. A reseller can remove the last entry in the certificate chain that contains user public key so that the reseller becomes the final owner of the device. This problem can happen because the ownership voucher is not protected against unauthorized ownership modification and does not support detection of such unauthorized changes.

The present techniques can be implemented to guard ownership vouchers against these unauthorized ownership modification problems.

It can be that an FDO ownership voucher architecture design does not guard against ownership voucher tampering, which can compromise device ownership. An ownership voucher can contain a list of ownership public keys. A last entry in a ownership voucher can belong to the current owner. This design can allow revoking current ownership simply by removing the last entry. To resolve the problem, a design can guard against unauthorized ownership modification.

A reason for this problem with prior approaches can be that an ownership transition involves two parties (e.g., the previous owner and the next owner). According to the presently described techniques herein, a third party can be added to an ownership transition that can be used to validate an authorized ownership transfer. Techniques can be implemented so that the third party can be trusted.

A current device owner can be authorized to modify ownership. Unauthorized device ownership modifications can be changes attempted by an entity other than the current owner.

While an FDO design can envision ownership vouchers flowing through supply change, it can be that there is no central authority that manages ownership vouchers and their access control. The present techniques can include a central authority and cryptographic technology to ensure that only authorized users (e.g., current owners) can modify ownership vouchers (where, in some examples, modifying an ownership voucher can comprise replacing one voucher with a new voucher, or otherwise indicating that the new voucher is now the valid voucher). In some examples, a central authority can be realized by a centralized service (which can have multiple instances), or by distributed ledger technology such as blockchain. The examples herein generally relate to a centralized service, and it can be appreciated that they can be implemented with a distributed ledger.

An FDO architecture design can define a device discovery service that is known to both the device and the ownership voucher. Device discovery service information can be described in a device credential in a device and in an ownership voucher header.

The device discovery service information can be expressed in a device as follows:

```
DeviceCredential = [
  DCActive: bool,
  DCProtVer: protver,
  DCHmacSecret: bstr, ;; confidentiality required
  DCDeviceInfo: tstr,
  DCGuid: Guid, ;; modified in TO2
  DCRVInfo: RendezvousInfo, ;; modified in TO2
  DCPubKeyHash: Hash ;; modified in TO2
]
```

The device discovery service information can be expressed in an ownership voucher header as follows:

```
;; Ownership Voucher header, also used in TO1 protocol
OVHeader = [
  OVHProtVer: protver, ;; protocol version
  OVGuid: Guid, ;; guid
  OVRVInfo: RendezvousInfo, ;; rendezvous instructions
  OVDeviceInfo: tstr, ;; DeviceInfo
  OVPubKey: PublicKey, ;; mfg public key
  OVDevCertChainHash:OVDevCertChainHashOrNull
]
```

A device discovery service can be an example of a central authority because this service can be known to both a device and a matching ownership voucher. In other examples, a separate service can be defined in both the device and the ownership voucher.

In some examples, a device discovery service can manage ownership vouchers and enforce access control.

The device discovery service can be implemented with an ownership voucher as follows. A device discovery service can function as an authoritative source of truth of ownership vouchers. In some examples, multiple device discovery services can collectively function as an authoritative source of truth of ownership vouchers. A manufacturer can associate with one or more device discovery services and delegate to these services an authority to manage the manufacturer's ownership vouchers until an FDO process for a device completes.

A device discovery service can manage an up-to-date version of an ownership voucher for a device, which can mean that the ownership voucher contains the current owner's public key, and the current owner's public key is signed by the previous owner. For example, when a distributor orders a device from a manufacturer, its ownership voucher can contain information about the distributor's public key that is signed by the manufacturer using the manufacturer's private key. An ownership voucher can maintain a chain of signed owner public key entries. It can be that, practically, only the last entry that contains the current owner's public key that is signed by the previous owner is relevant to ownership transfer.

The device discovery service can enforce access control such that (1) only the current owner is authorized to transfer ownership to a new owner, and (2) only the previous owner who signed the public key of the current owner is authorized to revoke the current owner's ownership and restore itself as the current owner. When a current ownership is revoked, the previous owner's signed public key record can be restored. This can mean that the device discovery service maintains a record of the chain of signed owner public keys, though it can be that there is no need to keep the chain of signed public keys in the ownership voucher. The device discovery service can authenticate the owner by validating the owner's possession of the private key associated with the public key in the ownership voucher. In some examples, the device discovery service can add additional authentication requirements to the owner.

An FDO process can implement three Transfer Ownership (TO) protocols—TO0, TO1, and TO2—which can be implemented in that order. In the context of these TO protocols, parts of the present techniques can be implemented before TO0. TO0, TO1, and TO2 can focus on device onboarding, while parts of the present techniques can focus on transferring ownership from one owner to another.

The present techniques can be implemented such that a new "Transferring Device Ownership" protocol is implemented as part of an ownership transfer event, where a current owner explicitly authorizes a device discovery service to transfer ownership to a next owner. Additionally, the device discovery service can enforce the ownership policy so that only a current owner is authorized to register an owner onboarding service to the device discovery service. This approach can guard against a previous owner from registering an owner onboarding service to spoof the onboarding process.

A Transfer Ownership Protocol (TDO) can be used for a current owner to setup a mapping between a device globally unique identifier (GUID) and a current owner onboarding service Internet Protocol (IP) address. This mapping information can be available over a limited time interval that is specified by the owner so that, during that time interval, an authorized device can retrieve the current owner's owner onboarding service IP address from the device discovery service.

The present techniques can be implemented such that the device discovery service can manage at most one set of owner onboarding service information. The three Transfer Ownership Protocols described (TO0, TO1, and TO2) can focus on device onboarding. The present techniques can be implemented to put an emphasis on a transfer of ownership from one owner to a next owner. During such an ownership transfer, a current set of owner onboarding service information, if it exists in the device discovery service, can be removed cleanly. A new owner can be permitted to define a new set of owner onboarding service information, either during an ownership transfer, or after a conclusion of the ownership transfer and before or during TO0.

Moreover, to guard against device onboarding attacks that can be triggered by spurious deliveries, a new owner can add a secret such as a symmetric key to the owner onboarding service that can be used to validate whether a device is authorized to retrieve the new owner's owner onboarding service IP address.

Applying the present techniques can protect a device owner's rights to device ownership and guard against unauthorized access, both to the device and to the owner's owner onboarding service.

An FDO protocol can be implemented to build a strong cryptographic link between a device and an ownership voucher digital record. An ownership voucher can track an ownership transition, but it can be that it does not guard against unauthorized device onboarding. The present techniques can be implemented to use a device discovery service as a trusted third party to record ownership transfers, and validation protocols to enforce an ownership policy so that a device can only onboard to the platform of an authorized owner.

Prior approaches to a device onboarding protocol can use a chain of owner public keys where each key is signed by the previous owner. While this chain can define a chain of ownership transitions, it can be that this approach does not protect unauthorized modifications to the ownership voucher that can invalidate established device ownership.

Example Architectures

FIG. 1 illustrates an example system architecture 100 that can facilitate guarding device onboarding ownership vouchers against unauthorized ownership changes, in accordance with an embodiment of this disclosure.

System architecture 100 comprises device manufacturer 102, cloud services platform 104, trusted device ownership enforcing device discovery component 106, owner onboarding service 108, management component 110, and device 112. In onboarding device 112, various operations can occur—operation 114-1, operation 114-2, operation 114-3, operation 114-4, operation 114-5, operation 114-6, and operation 114-7.

Figure 11:
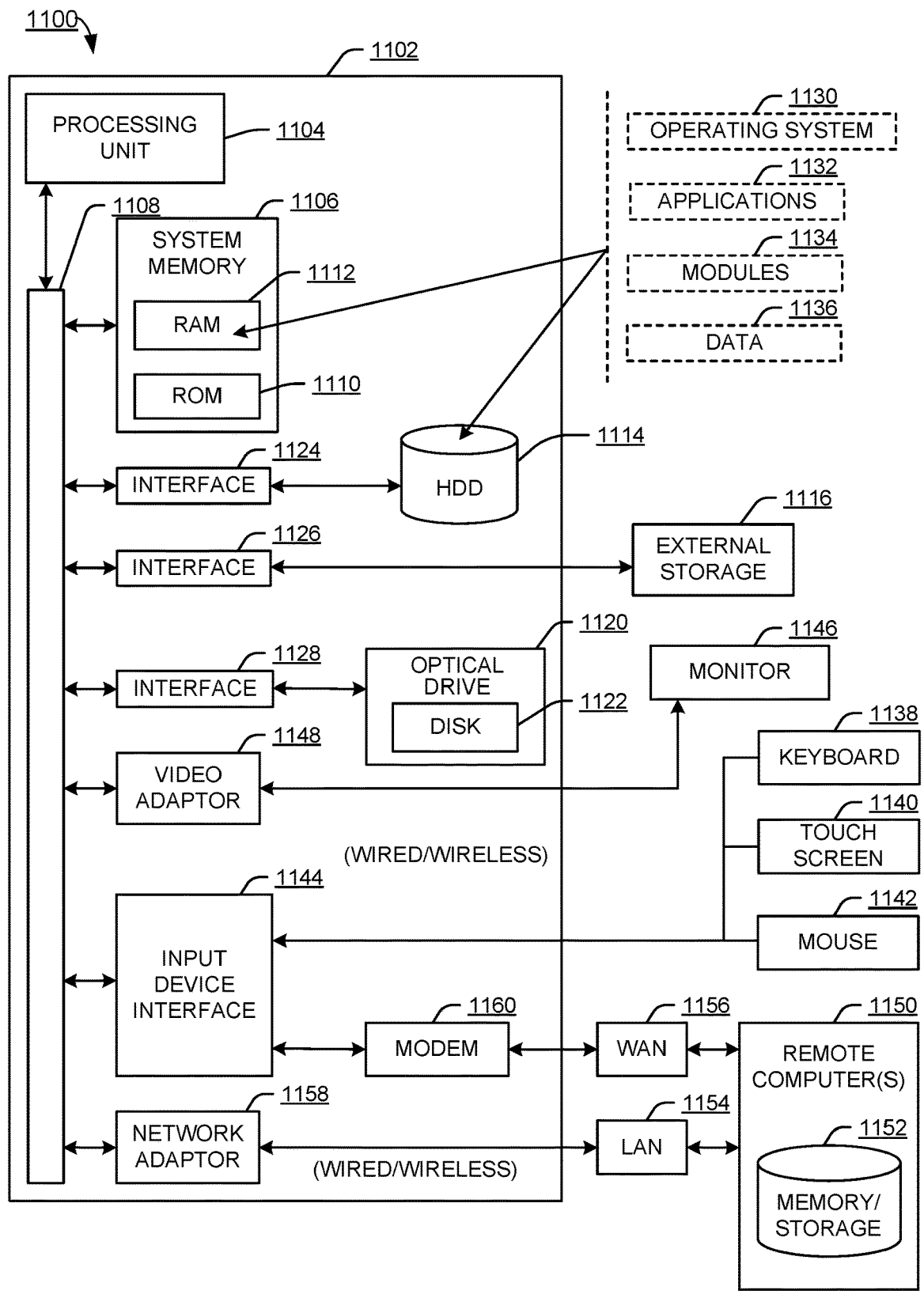
FIG. 11 illustrates an example block diagram of a computer operable to execute an embodiment of this disclosure.

Each of device manufacturer 102, cloud services platform 104, trusted device ownership enforcing device discovery component 106, owner onboarding service 108, management component 110, and/or device 112 can be implemented with part(s) of computing environment 1100 of FIG. 11.

Device manufacturer 102 can manufacture device 112, which can be a type of computer. Cloud services platform 104 can provide cloud computing resources to users, such as computer storage or compute resources. Trusted device ownership enforcing device discovery component 106 can implement a device discovery service so that a device connected to a same network as trusted device ownership enforcing device discovery component 106 can use the device discovery service to discovery other services on the network such as those provided by owner onboarding service 108.

Owner onboarding service 108 can be configured to implement an owner onboarding service that provisions new devices that are added to the network so that they can operate on the network (here, as part of cloud services platform 104), such as by installing files and/or scripts on the device.

Management component 110 can be configured to manage devices on a network, such as by updating them. Device 112 can be a computing device that can be manufacturer by device manufacturer 102 and that becomes part of cloud services platform 104.

As part of onboarding device 112 to cloud services platform 104, various operations can be performed. In operation 114-1, device manufacturer 102 manufactures device 112. In operation 114-2, device manufacturer 102 generates and signs an ownership voucher. This ownership voucher is transmitted to cloud services platform 104, which loads and stores it.

In operation 114-3, a transferring device ownership protocol can be implemented. In operation 114-3, a current owner of device 112 can authorize trusted device ownership enforcing device discovery component 106 to transfer ownership of device 112 to a next owner. Trusted device ownership enforcing device discovery component 106 can enforce the ownership policy so that only the current owner is authorized to register an owner onboarding service, such as owner onboarding service 108.

In operation 114-4, cloud services platform 104 registers ownership of device 112 with trusted device ownership enforcing device discovery component 106, using information from the ownership voucher from operation 114-2. This can comprise part of a symmetric key.

In operation 114-5, another part of the symmetric key is loaded onto device 112. In some examples, device 112 can implement an application programming interface endpoint that listens to requests to set a symmetric key on device 112. An owner can use a computer command to set the symmetric key on device 112 in response to determining that device 112 is powered on and on a network of the owner (e.g., cloud services platform 104). This approach can facilitate the onboarding process being automated. When cloud services platform 104 (e.g., via a proxy server) detects traffic from a device is not encrypted and signed with a correct key, and no key has been set on device 112, then cloud services platform 104 can call the device's application programming interface to set the key.

On operation 114-6, device 112 is powered on while connected to a network of cloud services platform 104, and device 112 contacts trusted device ownership enforcing device discovery component 106, which provides device 112 with an identifier of owner onboarding service 108 (e.g., an IP address of owner onboarding service 108).

In operation 114-7, device 112 communicates with owner onboarding service 108 to onboard device 112 to cloud services platform 104. In operation 114-8, device 112 and management component 110 communicate to effectuate management of device 112 as part of cloud services platform 104.

In some examples, owner onboarding service 108 can implement part(s) of the process flows of FIGS. 4-10 to implement guarding device onboarding ownership vouchers against unauthorized ownership changes.

It can be appreciated that system architecture 100 is one example system architecture for guarding device onboarding ownership vouchers against unauthorized ownership changes, and that there can be other system architectures that facilitate guarding device onboarding ownership vouchers against unauthorized ownership changes.

Figure 2:
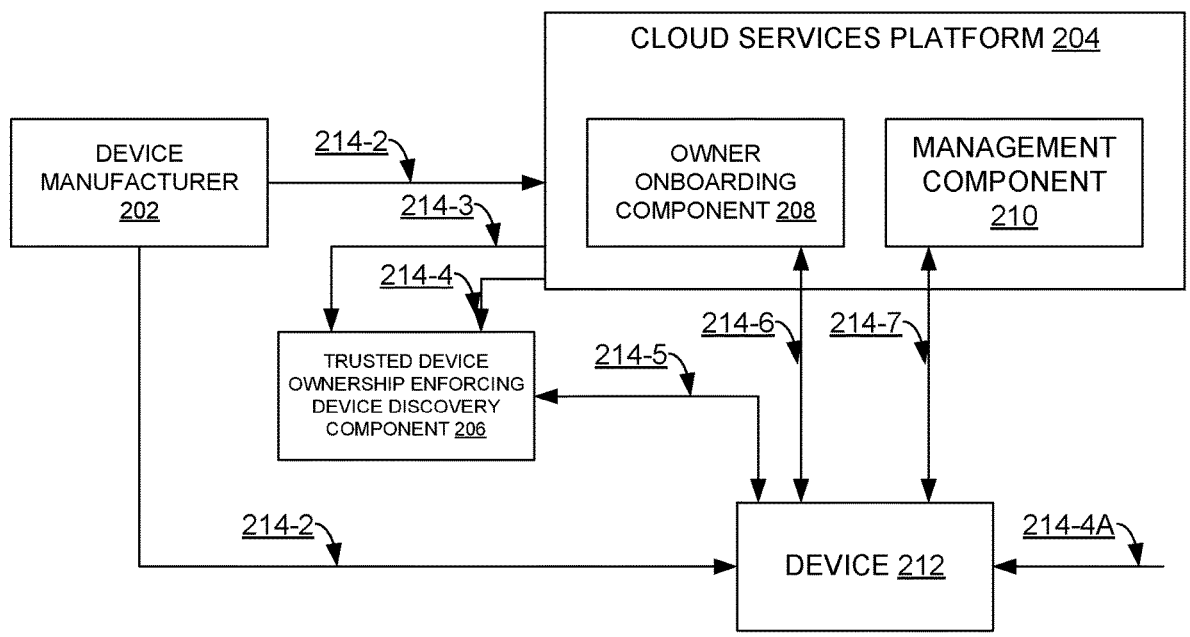
FIG. 2 illustrates another example system architecture that can facilitate guarding device onboarding ownership vouchers against unauthorized ownership changes, in accordance with an embodiment of this disclosure.

FIG. 2 illustrates another example system architecture 200 that can facilitate guarding device onboarding ownership vouchers against unauthorized ownership changes, in accordance with an embodiment of this disclosure.

System architecture 200 comprises device manufacturer 202, cloud services platform 204, trusted device ownership enforcing device discovery component 206, owner onboarding service 208, management component 210, and device 212. In onboarding device 212, various operations can occur—operation 214-1, operation 214-2, operation 214-3, operation 214-4, operation 214-5, operation 214-6, and operation 214-7. These parts of system architecture 200 can, respectively, be similar to device manufacturer 102, cloud services platform 104, trusted device ownership enforcing device discovery component 106, owner onboarding service 108, management component 110, device 112, operation 114-1, operation 114-2, operation 114-3, operation 114-4, operation 114-5, operation 114-6, and operation 114-7.

In contrast to system architecture 100, system architecture 200 also has operation 214-4A. In operation 214-4A, a symmetrical key can be loaded onto device 212. Trusted device ownership enforcing device discovery component 206 can also be loaded with a copy of the symmetrical key. Trusted device ownership enforcing device discovery component 206 can validate communications from devices to ensure that they are encoded with a symmetrical key that trusted device ownership enforcing device discovery component 206 also stores a copy of.

This can be performed, to guard against device onboarding attacks that may be triggered by spurious deliveries, in conjunction with guarding device onboarding ownership vouchers against unauthorized ownership changes.

FIG. 3 illustrates another example system architecture 300 that can facilitate guarding device onboarding ownership vouchers against unauthorized ownership changes, in accordance with an embodiment of this disclosure. In some examples, part(s) of system architecture 300 can be implemented by part(s) of system architecture 100 of FIG. 1 and/or system architecture 200 of FIG. 2 in the form of ownership vouchers. System architecture 300 can illustrate an example ownership voucher certificate chain which tracks device ownership changes as a device (e.g., device 112 and/or device 212) moves through a supply chain.

System architecture 300 comprises manufacturer 302, distributor 304, reseller 306, and customer 308—which are all entities that can own a device at various points. System architecture 300 also comprises ownership voucher 310, which can comprise ownership 312, ownership 314, and ownership 316.

An ownership voucher can identify device information, such as a device globally unique identifier (GUID), a device X.509 certificate containing the device's public key, and information about a device discovery service (e.g., trusted device ownership enforcing device discovery component 106). The device can have exclusive possession of its private key, and customer 308 can have exclusive possession of its private key.

The device can initially be owned by manufacturer 302. When manufacturer 302 passes ownership to distributor 304, manufacturer 302 can create ownership 312 in ownership voucher 310. In ownership 312, manufacturer 302 can sign the following information with its private key: device information, device discovery service information, and a public key of distributor 304.

Later, when distributor 304 passes ownership to reseller 306, distributor 304 can create ownership 314 in ownership voucher 310. In ownership 314, distributor 304 can sign the following information with its private key: device information, device discovery service information, and a public key of reseller 306.

Later, when reseller 306 passes ownership to customer 308, reseller 306 can create ownership 316 in ownership voucher 310. In ownership 316, reseller 306 can sign the following information with its private key: device information, device discovery service information, and a public key of customer 308.

In this matter, a verifiable ownership chain can be maintained as ownership of a device is transferred between entities. In some examples, in each of these steps, a new ownership voucher can be created. In other examples, in each of these steps, new ownership information can be appended to the current ownership voucher.

Example Process Flows

Figure 4:
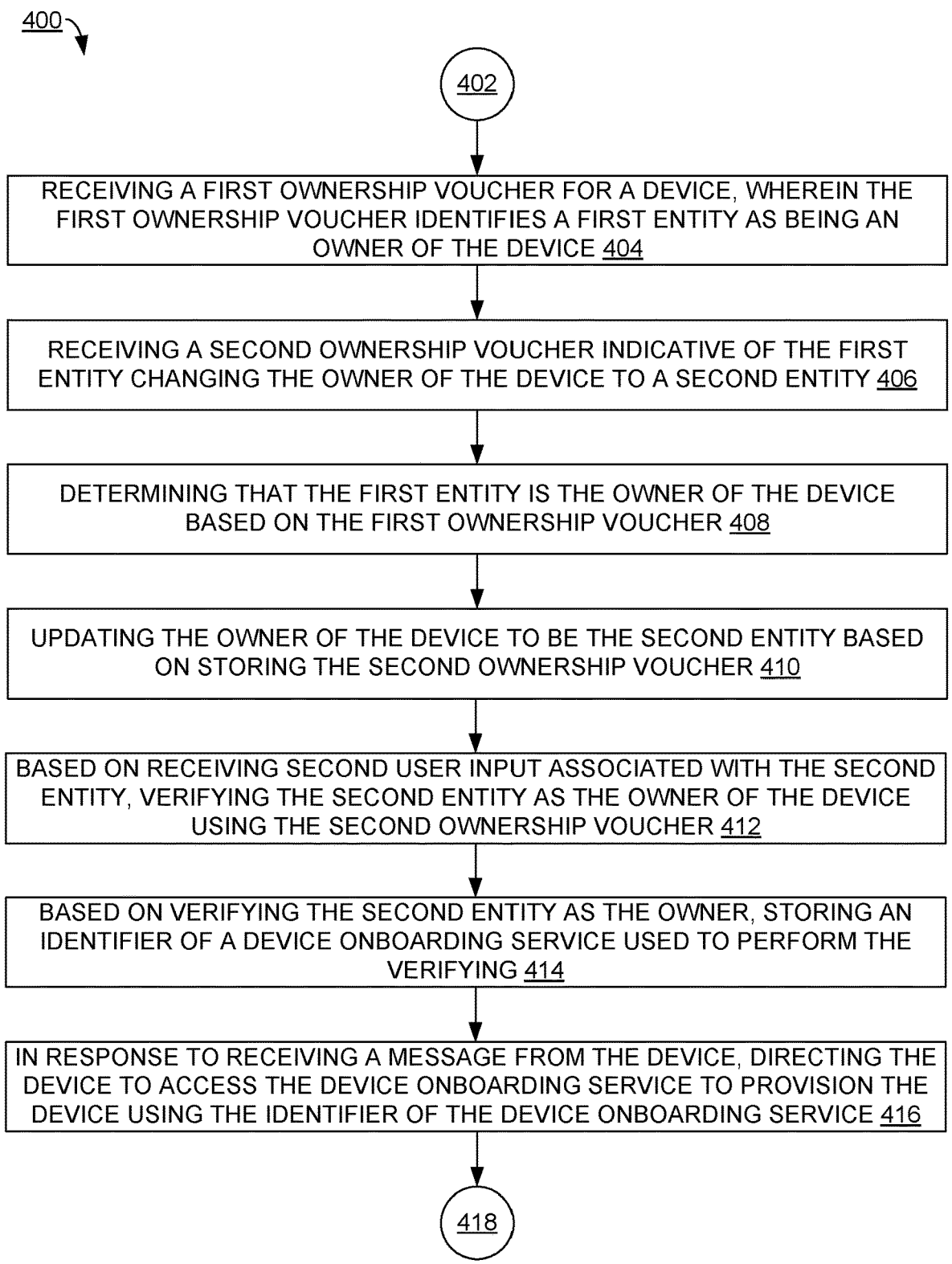
FIG. 4 illustrates an example process flow that can facilitate guarding device onboarding ownership vouchers against unauthorized ownership changes, in accordance with an embodiment of this disclosure.

FIG. 4 illustrates an example process flow 400 that can facilitate guarding device onboarding ownership vouchers against unauthorized ownership changes, in accordance with an embodiment of this disclosure. In some examples, one or more embodiments of process flow 400 can be implemented by system architecture 100 of FIG. 1 (e.g., by trusted device ownership enforcing device discovery component 106), or computing environment 1100 of FIG. 11.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 500 of FIG. 5, process flow 600 of FIG. 6, process flow 700 of FIG. 7, process flow 800 of FIG. 8, process flow 900 of FIG. 9, and/or process flow 1000 of FIG. 10.

Process flow 400 begins with 402, and moves to operation 404.

Operation 404 depicts receiving a first ownership voucher for a device, wherein the first ownership voucher identifies a first entity as being an owner of the device. That is, an ownership voucher for a device can be sent to a device discovery service that maintains authoritative device ownership records.

In some examples, the first ownership voucher is stored and maintained, with respect to updates to the ownership voucher, on a data store or a blockchain.

After operation 404, process flow 400 moves to operation 406.

Operation 406 depicts receiving a second ownership voucher indicative of the first entity changing the owner of the device to a second entity. That is, the device discovery service can receive a new ownership voucher that indicates a change in the owner of the device.

After operation 406, process flow 400 moves to operation 408.

Operation 408 depicts determining that the first entity is the owner of the device based on the first ownership voucher. That is, the device discovery service can use the first ownership voucher to identify the first entity as a current owner of the device, and can verify that the first entity is the entity that updated ownership in the second ownership voucher (such as by the first entity signing the ownership update with its private key, which can be verified with the first entity's public key).

After operation 408, process flow 400 moves to operation 410.

Operation 410 depicts updating the owner of the device to be the second entity via storing the second ownership voucher. That is, the device discovery service can update ownership of the device. In some examples, this can comprise overwriting the stored first ownership voucher with the second ownership voucher. In some examples, this can comprise storing the second ownership voucher without overwriting the first ownership voucher, and storing an indication that the second ownership voucher is the current ownership voucher.

After operation 410, process flow 400 moves to operation 412.

Operation 412 depicts based on receiving second user input associated with the second entity, verifying the second entity as the owner of the device using the second ownership voucher. That is, the device discovery service van verify that instructions regarding device ownership are received from the current owner or a previous owner.

After operation 412, process flow 400 moves to operation 414.

Operation 414 depicts, based on verifying the second entity as the owner, storing an identifier of a device onboarding service used to perform the verifying. That is, the new owner can tell the device discovery service its IP address for its owner onboarding service.

After operation 414, process flow 400 moves to operation 416.

Operation 416 depicts in response to receiving a message from the device, directing the device to access the device onboarding service to provision the device using the identifier of the device onboarding service. That is, when the device connects to the device discovery service, the device discovery service can direct the device to the new owner's owner onboarding service.

In some examples, operations 404-416 are performed by a central authority. That is, a central authority can manage ownership vouchers. In some examples, operations 404-416 are performed by a device discovery service. That is, the device discovery service can function as a central authority. In some examples, the device discovery service is a member of a group of device discovery services that is configured to provide device discovery services to the device. That is, the central authority can be implemented across multiple device discovery services.

In some examples, the identifier of the device onboarding service is a first identifier, operations 404-416 are performed by a central authority of the system, and the central authority is identified by a second identifier comprised in a device credential on the device. That is, the device can identify the central authority based on a device credential that is stored in the device.

In some examples, the identifier of the device onboarding service is a first identifier, operations 404-416 are performed by a central authority of the system, and the central authority is identified by a second identifier comprised in the ownership voucher. That is, an ownership voucher header can identify the central authority.

After operation 416, process flow 400 moves to 418, where process flow 400 ends.

FIG. 5 illustrates an example process flow 500 that can facilitate guarding device onboarding ownership vouchers against unauthorized ownership changes, in accordance with an embodiment of this disclosure. In some examples, one or more embodiments of process flow 500 can be implemented by system architecture 100 of FIG. 1 (e.g., by trusted device ownership enforcing device discovery component 106), or computing environment 1100 of FIG. 11.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 400 of FIG. 4, process flow 600 of FIG. 6, process flow 700 of FIG. 7, process flow 800 of FIG. 8, process flow 900 of FIG. 9, and/or process flow 1000 of FIG. 10.

Process flow 500 begins with 502, and moves to operation 504.

Operation 504 depicts receiving a first ownership voucher applicable to ownership of a device, wherein the first ownership voucher identifies a first entity as an owner of the device and a prior owner, wherein the first ownership voucher identifies that the first owner has permission to set a new owner of the device, and wherein the first ownership voucher identifies that the prior owner has permission to revoke the first entity from being the owner of the device. In some examples, operation 504 can be implemented in a similar manner as operation 404 of FIG. 4.

After operation 504, process flow 500 moves to operation 506.

Operation 506 depicts receiving a second ownership voucher indicative of the first entity changing the owner of the device to a second entity. In some examples, operation 506 can be implemented in a similar manner as operation 406 of FIG. 4.

After operation 506, process flow 500 moves to operation 508.

Operation 508 depicts determining that the first entity is the owner of the device based on the first ownership voucher. In some examples, operation 508 can be implemented in a similar manner as operation 408 of FIG. 4.

After operation 508, process flow 500 moves to operation 510.

Operation 510 depicts updating the owner of the device to the second entity via storing the second ownership voucher. In some examples, operation 510 can be implemented in a similar manner as operation 410 of FIG. 4.

In some examples, operation 510 comprises, based on verifying the second entity as the owner of the device using the second ownership voucher, storing an identifier of a device onboarding service that is received based on user input from the second entity. In some examples, this can be implemented in a similar manner as operation 414 of FIG. 4.

In some examples, the identifier of the device onboarding service is a first identifier, and the storing the identifier of the device onboarding service comprises storing an association between the first identifier of the device onboarding service and a second identifier of the device. That is, a mapping can be stored from the device to the owner onboarding service. In some examples, the identifier of the device onboarding service comprises an Internet Protocol address of the device onboarding service.

In some examples, operation 510 comprises, based on a message received from the device, directing the device to access the device onboarding service for a provisioning of the device via the identifier of the device onboarding service. In some examples, this can be implemented in a similar manner as operation 416 of FIG. 4.

In some examples, ownership can eventually be changed from the second entity to a third entity, then to a fourth entity, etc.

After operation 510, process flow 500 moves to 512, where process flow 500 ends.

FIG. 6 illustrates an example process flow 600 that can facilitate guarding device onboarding ownership vouchers against unauthorized ownership changes, in accordance with an embodiment of this disclosure. In some examples, one or more embodiments of process flow 600 can be implemented by system architecture 100 of FIG. 1 (e.g., by trusted device ownership enforcing device discovery component 106), or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 400 of FIG. 4, process flow 500 of FIG. 5, process flow 700 of FIG. 7, process flow 800 of FIG. 8, process flow 900 of FIG. 9, and/or process flow 1000 of FIG. 10.

Process flow 600 begins with 602, and moves to operation 604.

Operation 604 depicts receiving a third ownership voucher that indicates that the second entity has updated the owner of the device to a third entity. This can be the second entity from operation 510 of FIG. 5.

After operation 604, process flow 600 moves to operation 606.

Operation 606 depicts determining that the second entity is the owner of the device based on the second ownership voucher. The second ownership voucher can be the second ownership voucher from operation 510 of FIG. 5.

After operation 606, process flow 600 moves to operation 608.

Operation 608 depicts updating the owner of the device to the third entity via storing the third ownership voucher. That is, where a current owner requests that ownership be updated, that request can be followed.

After operation 608, process flow 600 moves to 610, where process flow 600 ends.

In process flow 600, ownership can continue to be updated—a current owner can update ownership to a new owner, which can update ownership to another new owner, and so on. For example, this process can continue through a fourth entity becoming the owner of the device, a fifth entity becoming the owner of the device, etc.

Figure 7:
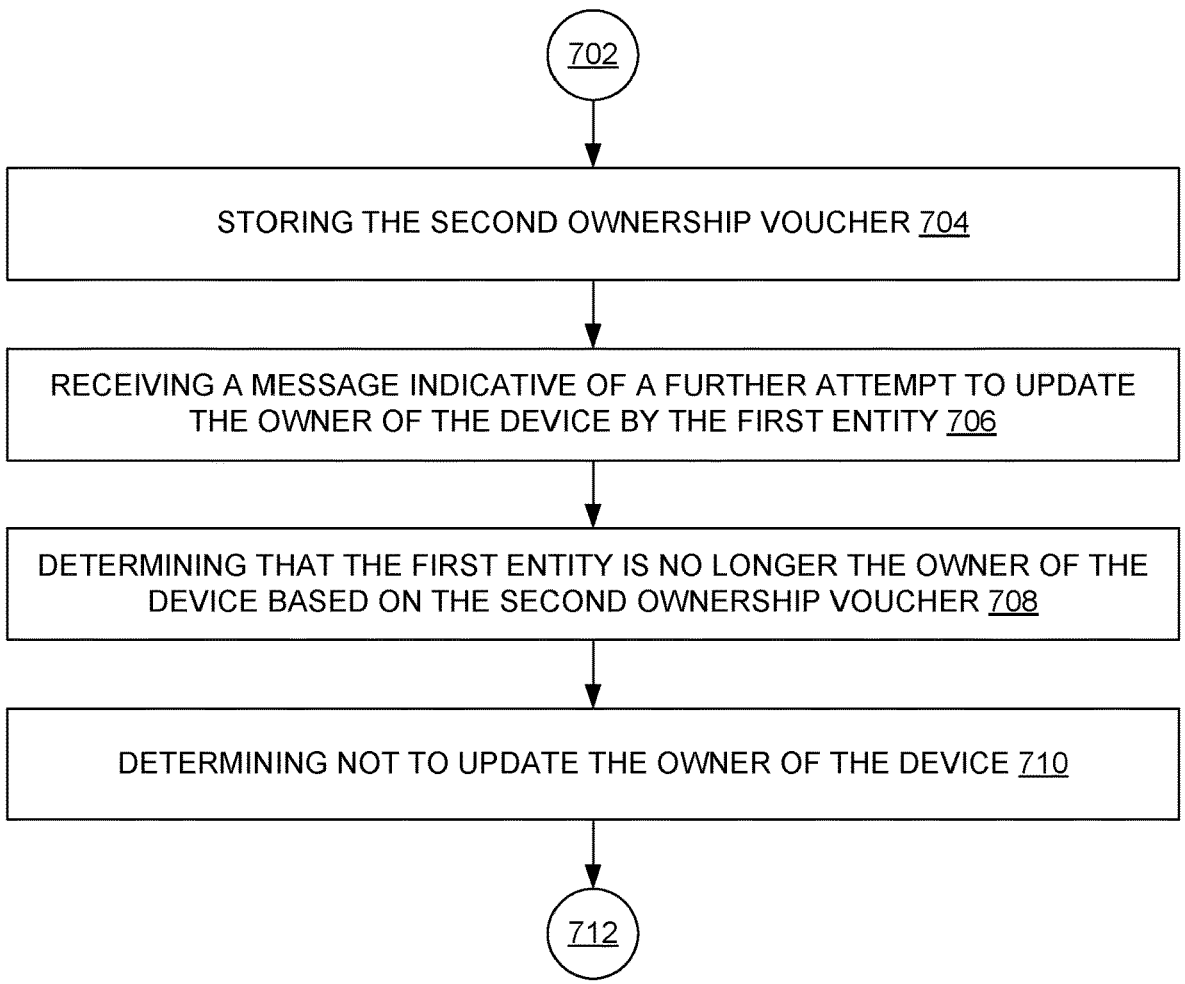
FIG. 7 illustrates another example process flow that can facilitate guarding device onboarding ownership vouchers against unauthorized ownership changes, in accordance with an embodiment of this disclosure.

FIG. 7 illustrates an example process flow 700 that can facilitate guarding device onboarding ownership vouchers against unauthorized ownership changes, in accordance with an embodiment of this disclosure. In some examples, one or more embodiments of process flow 700 can be implemented by system architecture 100 of FIG. 1 (e.g., by trusted device ownership enforcing device discovery component 106), or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 400 of FIG. 4, process flow 500 of FIG. 5, process flow 600 of FIG. 6, process flow 800 of FIG. 8, process flow 900 of FIG. 9, and/or process flow 1000 of FIG. 10.

Process flow 700 begins with 702, and moves to operation 704.

Operation 704 depicts storing a second ownership voucher. This can be an ownership voucher that indicates that the second entity is the owner of the device, as in operation 510 of FIG. 5.

After operation 704, process flow 700 moves to operation 706.

Operation 706 depicts receiving a message indicative of a further attempt to update the owner of the device by the first entity. This can be similar to operation 506 of FIG. 5, but at a point where the first entity is no longer the owner of the device.

After operation 706, process flow 700 moves to operation 708.

Operation 708 depicts determining that the first entity is no longer the owner of the device based on the updated ownership voucher. That is, the updated ownership voucher can be examined to determine a current owner, and that the first entity is no longer the current owner.

After operation 708, process flow 700 moves to operation 710.

Operation 710 depicts determining not to update the owner of the device. That is, updating the owner of the device can be an action restricted to the current owner. As the first entity is no longer the current owner, its request to update ownership can be denied.

After operation 708, process flow 700 moves to 712, where process flow 700 ends.

Figure 8:
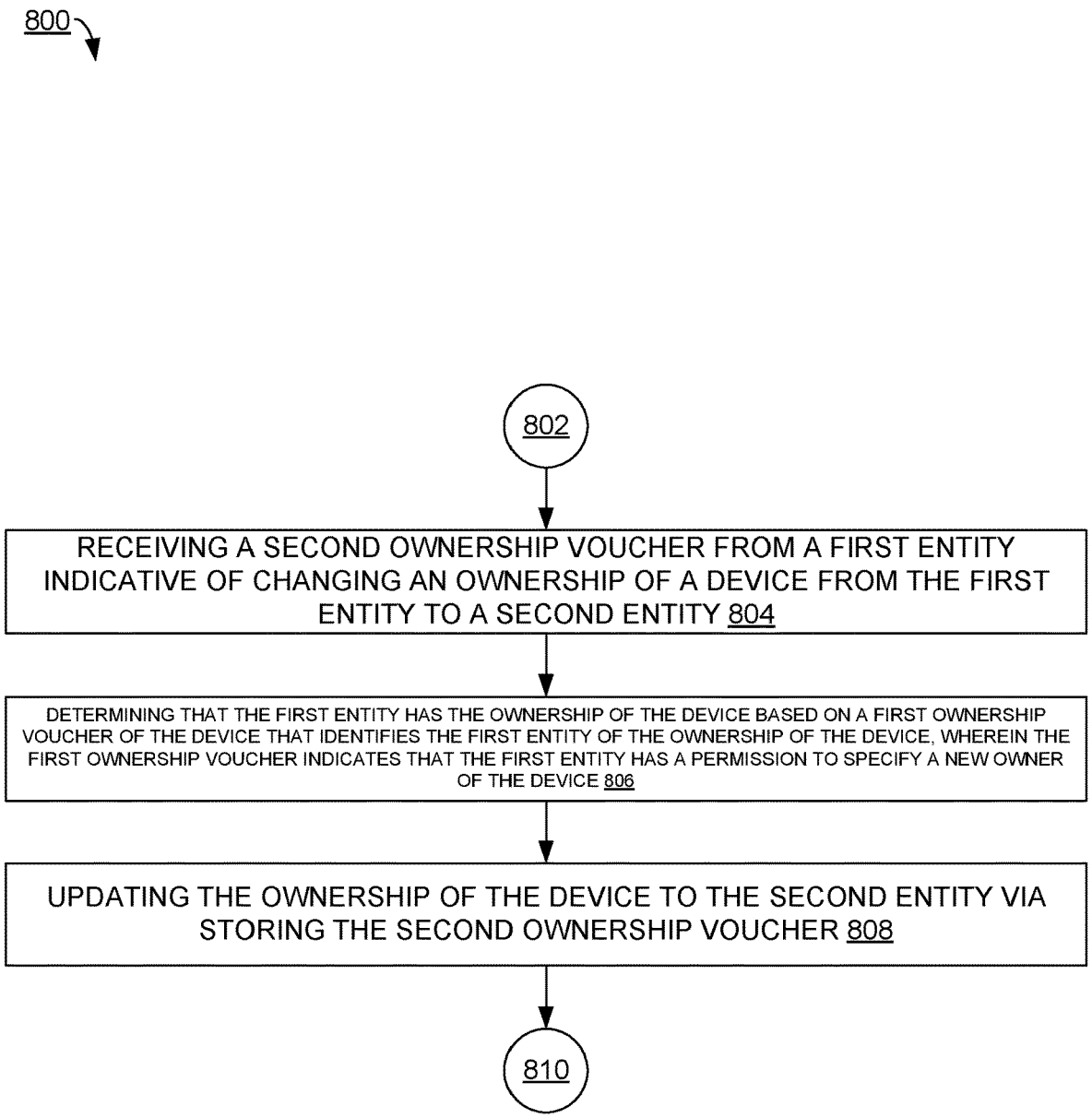
FIG. 8 illustrates another example process flow that can facilitate guarding device onboarding ownership vouchers against unauthorized ownership changes, in accordance with an embodiment of this disclosure.

FIG. 8 illustrates an example process flow 800 that can facilitate guarding device onboarding ownership vouchers against unauthorized ownership changes, in accordance with an embodiment of this disclosure. In some examples, one or more embodiments of process flow 800 can be implemented by system architecture 100 of FIG. 1 (e.g., by trusted device ownership enforcing device discovery component 106), or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 400 of FIG. 4, process flow 500 of FIG. 5, process flow 600 of FIG. 6, process flow 700 of FIG. 7, process flow 900 of FIG. 9, and/or process flow 1000 of FIG. 10.

Process flow 800 begins with 802, and moves to operation 804.

Operation 804 depicts receiving a second ownership voucher from a first entity indicative of changing an ownership of a device from the first entity to a second entity. In some examples, operation 804 can be implemented in a similar manner as operation 506 of FIG. 5.

In some examples, the ownership of the device is maintained according to a fast identity online device onboarding protocol. That is, an FDO protocol can be implemented.

After operation 804, process flow 800 moves to operation 806.

Operation 806 depicts determining that the first entity has the ownership of the device based on a first ownership voucher of the device that identifies the first entity of the ownership of the device, wherein the first ownership voucher indicates that the first entity has a permission to specify a new owner of the device. In some examples, operation 806 can be implemented in a similar manner as operation 508 of FIG. 5.

After operation 806, process flow 800 moves to operation 808.

Operation 808 depicts updating the ownership of the device to the second entity via storing the second ownership voucher. In some examples, operation 808 can be implemented in a similar manner as operation 510 of FIG. 5.

In some examples, operation 808 comprises maintaining a chain of ownership in the second ownership voucher that identifies the first entity as having formerly owned of the device and identifies the second entity having the ownership of the device. That is, a central authority can maintain a chain of ownership.

Figure 9:
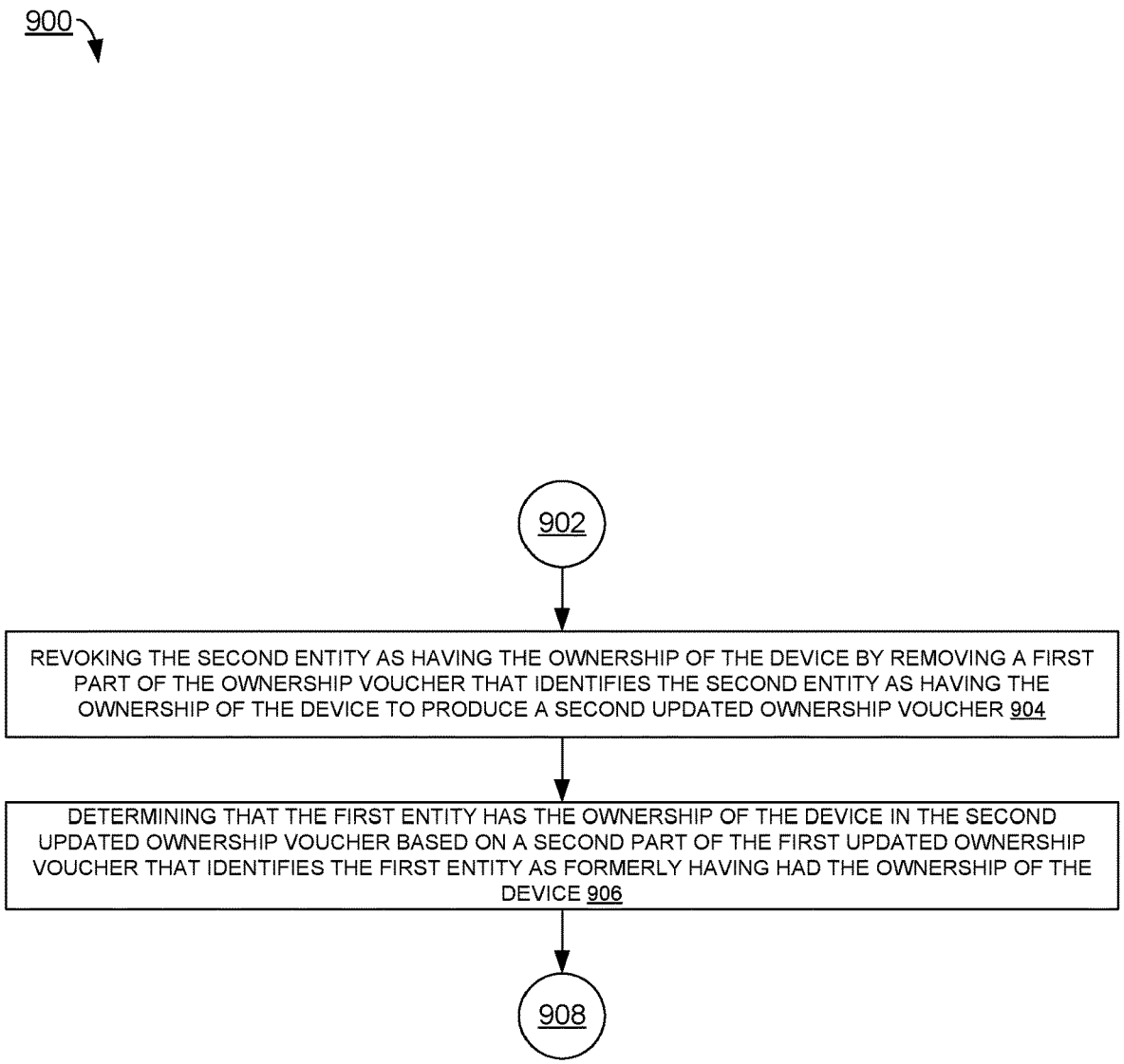
FIG. 9 illustrates another example process flow that can facilitate guarding device onboarding ownership vouchers against unauthorized ownership changes, in accordance with an embodiment of this disclosure.

FIG. 9 illustrates an example process flow 900 that can facilitate guarding device onboarding ownership vouchers against unauthorized ownership changes, in accordance with an embodiment of this disclosure. In some examples, one or more embodiments of process flow 900 can be implemented by system architecture 100 of FIG. 1 (e.g., by trusted device ownership enforcing device discovery component 106), or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, and/or process flow 1000 of FIG. 10.

Process flow 900 begins with 902, and moves to operation 904.

Operation 904 depicts revoking the second entity as having the ownership of the device by removing a first part of the ownership voucher that identifies the second entity as having the ownership of the device to produce a second updated ownership voucher. That is, ownership can be revoked by stripping off a newest entry in an ownership chain in an ownership voucher.

In some examples, operation 904 comprises determining to revoke the second entity as having the ownership of the device based on validating a message associated with the second entity that is indicative of revoking the second entity as having the ownership. That is, a current owner can revoke its own ownership.

After operation 904, process flow 900 moves to operation 906.

Operation 906 depicts determining that the first entity has the ownership of the device in the second updated ownership voucher based on a second part of the first updated ownership voucher that identifies the first entity as formerly having had the ownership of the device. That is, when a second entity has been stripped of ownership, ownership can return to a first entity that was an owner before granting ownership to the second entity.

After operation 906, process flow 900 moves to 908, where process flow 900 ends.

Figure 10:
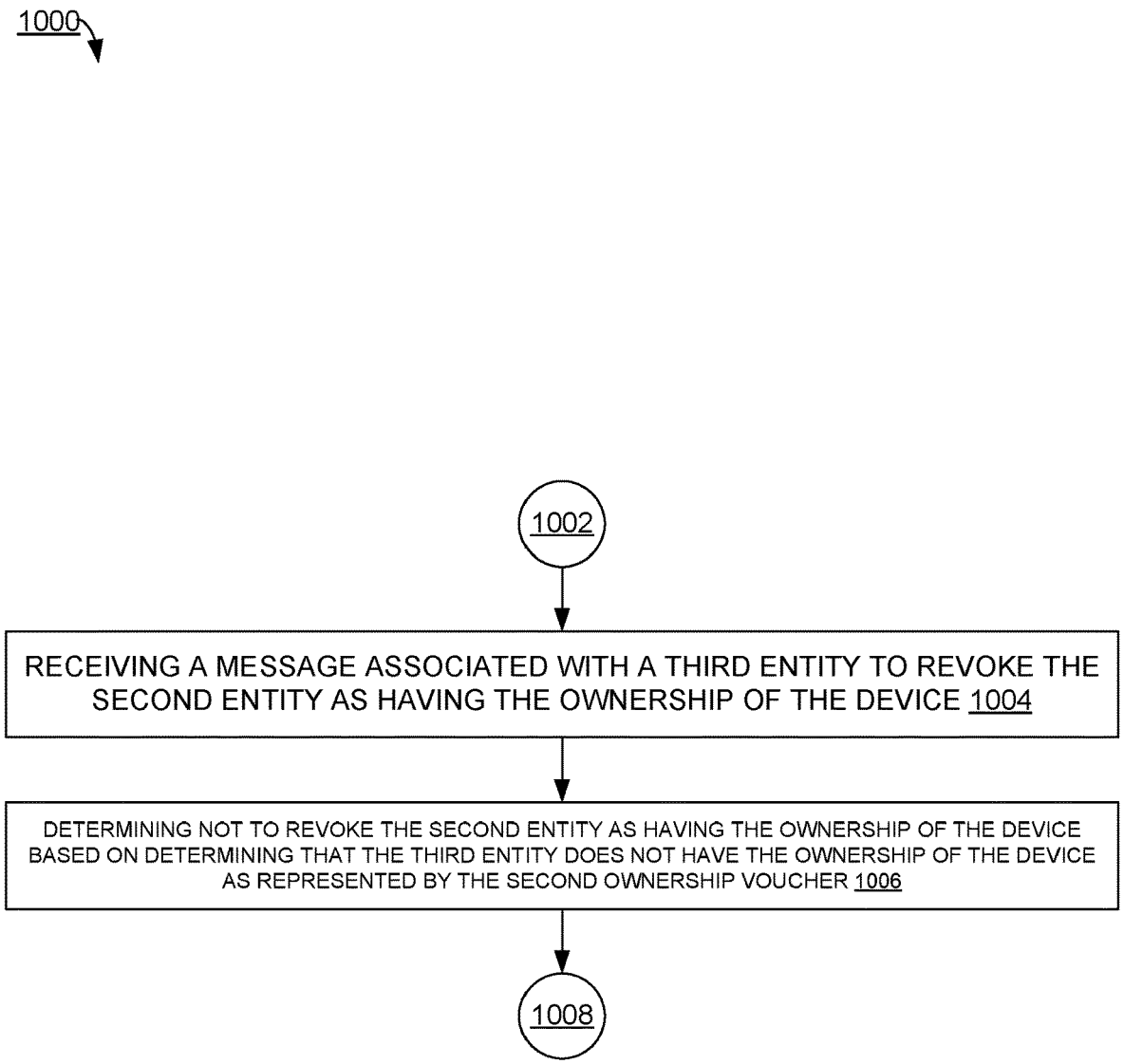
FIG. 10 illustrates another example process flow that can facilitate guarding device onboarding ownership vouchers against unauthorized ownership changes, in accordance with an embodiment of this disclosure.

FIG. 10 illustrates an example process flow 1000 that can facilitate guarding device onboarding ownership vouchers against unauthorized ownership changes, in accordance with an embodiment of this disclosure. In some examples, one or more embodiments of process flow 1000 can be implemented by system architecture 100 of FIG. 1 (e.g., by trusted device ownership enforcing device discovery component 106), or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, and/or process flow 900 of FIG. 9.

Process flow 1000 begins with 1002, and moves to operation 1004.

Operation 1004 depicts receiving a message associated with a third entity to revoke the second entity as having the ownership of the device. That is, where the second entity is the current owner of a device, some other entity can request that the second entity's ownership be revoked.

After operation 1004, process flow 1000 moves to operation 1006.

Operation 1006 depicts determining not to revoke the second entity as having the ownership of the device based on determining that the third entity does not have the ownership of the device as represented by the second ownership voucher. That is, it can be that only a current owner can revoke its own ownership, and requests to revoke ownership by an entity other than the current owner will be disregarded.

After operation 1006, process flow 1000 moves to 1008, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of device manufacturer 102, cloud services platform 104, trusted device ownership enforcing device discovery component 106, owner onboarding service 108, management component 110, and/or device 112 of FIG. 1.

In some examples, computing environment 1100 can implement one or more embodiments of the process flows of FIGS. 4-10 to facilitate guarding device onboarding ownership vouchers against unauthorized ownership changes.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples, and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor; and
   at least one memory coupled to the processor, comprising instructions that cause the at least one processor to perform operations comprising:
      receiving, by the system, a first ownership voucher for a device, wherein the first ownership voucher identifies a first entity as being an owner of the device;
      receiving, by the system, a second ownership voucher indicative of the first entity changing the owner of the device to a second entity;
      determining, by the system, that the first entity is the owner of the device based on the first ownership voucher;
      updating, by the system, the owner of the device to be the second entity via storing the second ownership voucher;
      based on receiving second user input associated with the second entity, verifying, by the system, the second entity as the owner of the device using the second ownership voucher;
      based on verifying the second entity as the owner, storing, by the system, an identifier of a device onboarding service that was accessed as part of performing the verifying, wherein the device onboarding service is separate from the system, wherein the device onboarding service enforces a first policy that only the owner of the device is authorized to transfer ownership of the device, and wherein the device onboarding service enforces a second policy that only an immediately-prior owner of the device is authorized to revoke an ownership transfer of the device; and
      in response to receiving a message from the device, directing, by the system, the device to access the device onboarding service to provision the device using the identifier of the device onboarding service.

2. The system of claim 1, wherein the receiving the first ownership voucher, the receiving the request, the determining, the updating, the receiving the identifier, and the directing are performed by a device discovery service of the system.

3. The system of claim 1, wherein the receiving the first ownership voucher, the receiving the request, the receiving the second ownership voucher, the updating, the receiving the second user input, the verifying, and the directing are performed by a central authority of the system.

4. The system of claim 1, wherein the receiving the first ownership voucher, the receiving the request, the determining, the updating, the receiving the identifier, and the directing are performed by a device discovery service of the system, and wherein the device discovery service is a member of a group of device discovery services that is configured to provide device discovery services to the device.

5. The system of claim 1, wherein the first ownership voucher is stored and maintained, with respect to updates to owning the device, on a data store or a blockchain.

6. The system of claim 1, wherein the identifier of the device onboarding service is a first identifier, wherein the receiving the first ownership voucher, the receiving the second ownership voucher, the determining, the updating, the receiving the second user input, the verifying, and the directing are performed by a central authority of the system, and wherein the central authority is identified by a second identifier comprised in a device credential on the device.

7. The system of claim 1, wherein the identifier of the device onboarding service is a first identifier, wherein the receiving the first ownership voucher, the receiving the second ownership voucher, the determining, the updating, the receiving the second user input, the verifying, and the directing are performed by a central authority of the system, and wherein the central authority is identified by a second identifier comprised in the first ownership voucher.

8. A method, comprising:
receiving, by a system comprising at least one processor, a first ownership voucher applicable to ownership of a device, wherein the first ownership voucher identifies a first entity as an owner of the device and a prior owner, wherein the first ownership voucher identifies that the owner has permission to set a new owner of the device, wherein the first ownership voucher identifies that the prior owner has permission to revoke the first entity from being the owner of the device, wherein the system is configured to enforce a first policy that only the owner of the device is authorized to transfer ownership of the device, and wherein the system is configured to enforce a second policy that only an immediately-prior owner of the device is authorized to revoke an ownership transfer of the device;
receiving, by the system, a second ownership voucher indicative of the first entity changing the owner of the device to a second entity;
determining, by the system, that the first entity is the owner of the device based on the first ownership voucher;
updating, by the system, the owner of the device to the second entity via storing the second ownership voucher;
based on verifying the second entity as the owner of the device using the second ownership voucher, storing, by the system, an identifier of a device onboarding service that is received based on user input from the second entity, wherein the device onboarding service is separate from the system; and
based on a message received from the device, directing, by the system, the device to access the device onboarding service for a provisioning of the device via the identifier of the device onboarding service.

9. The method of claim 8, further comprising:
in response to receiving a third ownership voucher that indicates that the second entity has updated the owner of the device to a third entity, and in response to determining that the second entity is the owner of the device based on the second ownership voucher, updating, by the system, the owner of the device to the third entity via storing the third ownership voucher.

10. The method of claim 8, further comprising:
after storing the second ownership voucher, based on a message received by the system indicative of a further attempt to update the owner of the device by the first entity, and in response to determining that the first entity is no longer the owner of the device based on the second ownership voucher, determining, by the system, not to update the owner of the device.

11. The method of claim 8, wherein the identifier of the device onboarding service is a first identifier, and wherein the storing the identifier of the device onboarding service comprises:
storing, by the system, an association between the first identifier of the device onboarding service and a second identifier of the device.

12. The method of claim 8, wherein the identifier of the device onboarding service comprises an Internet Protocol address of the device onboarding service.

13. A non-transitory computer-readable medium comprising instructions that, in response to execution, cause a system comprising at least one processor to perform operations, comprising:
receiving a second ownership voucher from a first entity indicative of changing an ownership of a device from the first entity to a second entity, wherein the system is configured to enforce a first policy that only the owner of the device is authorized to transfer ownership of the device, and wherein the system is configured to enforce a second policy that only an immediately-prior owner of the device is authorized to revoke an ownership transfer of the device;
determining that the first entity has the ownership of the device based on a first ownership voucher of the device that identifies the first entity of the ownership of the device, wherein the first ownership voucher indicates that the first entity has a permission to specify a new owner of the device;
updating the ownership of the device to the second entity via storing the second ownership voucher;
based on verifying the second entity as the owner of the device using the second ownership voucher, storing an identifier of a device onboarding service that is received based on user input from the second entity, wherein the device onboarding service is separate from the system; and
based on a message received from the device, directing the device to access the device onboarding service for a provisioning of the device via the identifier of the device onboarding service.

14. The non-transitory computer-readable medium of claim 13, wherein the receiving the second ownership voucher, the determining, the updating, the storing the identifier, and the directing are performed by a device discovery service of the system.

15. The non-transitory computer-readable medium of claim 13, wherein the receiving the second ownership voucher, the determining, the updating, the storing the identifier, and the directing are performed by a central authority of the system.

16. The non-transitory computer-readable medium of claim 13, wherein the ownership of the device is maintained according to a fast identity online device onboarding protocol.

17. The non-transitory computer-readable medium of claim 13, wherein the operations further comprise:
maintaining a chain of ownership in the second ownership voucher that identifies the first entity as having formerly owned of the device and identifies the second entity having the ownership of the device.

18. The non-transitory computer-readable medium of claim 17, wherein the operations further comprise:
revoking the second entity as having the ownership of the device by removing a first part of the ownership voucher that identifies the second entity as having the ownership of the device to produce a second updated ownership voucher; and
determining that the first entity has the ownership of the device in the second updated ownership voucher based on a second part of the second updated ownership voucher that identifies the first entity as formerly having had the ownership of the device.

19. The non-transitory computer-readable medium of claim 18, wherein the operations further comprise:
determining to revoke the second entity as having the ownership of the device based on validating a message associated with the second entity that is indicative of revoking the second entity as having the ownership.

20. The non-transitory computer-readable medium of claim 17, wherein the operations further comprise:
receiving a message associated with a third entity to revoke the second entity as having the ownership of the device; and
determining not to revoke the second entity as having the ownership of the device based on determining that the third entity does not have the ownership of the device as represented by the second ownership voucher.

* * * * *